United States Patent
Lecoeuche

(10) Patent No.: US 12,255,682 B2
(45) Date of Patent: Mar. 18, 2025

(54) OPTICAL TIME-DOMAIN REFLECTOMETER (OTDR) INCLUDING CHANNEL CHECKER

(71) Applicant: VIAVI SOLUTIONS INC., Chandler, AZ (US)

(72) Inventor: Vincent Lecoeuche, Tarentaise (FR)

(73) Assignee: VIAVI SOLUTIONS INC., Chandler, AZ (US)

( * ) Notice: Subject to any disclaimer, the term of this patent is extended or adjusted under 35 U.S.C. 154(b) by 0 days.

(21) Appl. No.: 18/587,453

(22) Filed: Feb. 26, 2024

(65) Prior Publication Data

US 2024/0195497 A1    Jun. 13, 2024

Related U.S. Application Data

(62) Division of application No. 17/736,273, filed on May 4, 2022, now Pat. No. 11,942,986.

(30) Foreign Application Priority Data

Sep. 24, 2021   (EP) ..................................... 21306326

(51) Int. Cl.
*H04B 10/07* (2013.01)
*H04B 10/071* (2013.01)
(Continued)

(52) U.S. Cl.
CPC ....... *H04B 10/071* (2013.01); *H04B 10/2537* (2013.01); *H04B 10/503* (2013.01);
(Continued)

(58) Field of Classification Search
CPC .............. H04B 10/071; H04B 10/2537; H04B 10/503; H04B 10/07; H04B 10/60;
(Continued)

(56) References Cited

U.S. PATENT DOCUMENTS 5,821,426 A    10/1998   Uchiyama
6,483,320 B1 *  11/2002   Makita ................... G01D 9/005
                                              324/555

(Continued)

FOREIGN PATENT DOCUMENTS

EP           3232165 A1    10/2017

OTHER PUBLICATIONS

IEEE Photonics Technology Letters, vol. 17, No. 12, Dec. 2005 2691 Fault Localization in WDM Passive Optical Network by Reusing Downstream Light Sources K. W. Lim, E. S. Son, Student Member, IEEE, K. H. Han, and Y. C. Chung, Senior Member, IEEE.

(Continued)

*Primary Examiner* — Dibson J Sanchez
(74) *Attorney, Agent, or Firm* — Mannava & Kang, P.C.

(57) ABSTRACT

According to examples, a channel checker optical time-domain reflectometer (OTDR) may include a laser source to emit a laser beam. An optical switch may be optically connected to the laser source to receive the laser beam and to selectively transmit the laser beam to a circulator that is optically connected to a device under test (DUT). A first coupler may be optically connected to a first photodiode and to the circulator. A second coupler may be optically connected to the first coupler, the optical switch, and a second photodiode.

20 Claims, 6 Drawing Sheets

(51) Int. Cl.
   *H04B 10/2537* (2013.01)
   *H04B 10/50* (2013.01)
   *G01D 5/353* (2006.01)
   *G01M 11/00* (2006.01)
   *H04B 10/60* (2013.01)
   *H04B 10/61* (2013.01)

(52) U.S. Cl.
   CPC ..... *G01D 5/35361* (2013.01); *G01D 5/35364* (2013.01); *G01M 11/3109* (2013.01); *H04B 10/07* (2013.01); *H04B 10/60* (2013.01); *H04B 10/61* (2013.01); *H04B 10/614* (2013.01)

(58) Field of Classification Search
   CPC . H04B 10/61; H04B 10/614; G01M 11/3109; G01D 5/35361; G01D 5/35364
   USPC ........................................ 398/9–38, 202–214
   See application file for complete search history.

(56) References Cited

U.S. PATENT DOCUMENTS

| | | | |
|---|---|---|---|
| 7,126,680 B2 * | 10/2006 | Yamate | G01K 11/3206 356/73.1 |
| 8,023,540 B2 * | 9/2011 | Kupershmidt | H01S 5/40 372/32 |
| 8,149,419 B2 | 4/2012 | Fan | |
| 9,410,826 B2 | 8/2016 | Bastianini | |
| 9,689,772 B2 | 6/2017 | Zou | |
| 9,804,001 B2 | 10/2017 | Nikles | |
| 9,829,429 B2 | 11/2017 | Cyr | |
| 10,461,850 B2 | 10/2019 | He | |
| 10,634,551 B2 | 4/2020 | Galt Arossa | |
| 10,775,246 B2 | 9/2020 | Lecoeuche | |
| 10,935,398 B2 | 3/2021 | Austin | |
| 11,469,816 B2 | 10/2022 | Jostmeier | |
| 11,828,631 B2 | 11/2023 | Ronnekleiv | |
| 2004/0208501 A1 * | 10/2004 | Saunders | H04B 10/0793 398/9 |
| 2006/0245468 A1 * | 11/2006 | Hartog | G01K 11/32 374/161 |
| 2008/0018903 A1 * | 1/2008 | Bao | G01L 1/242 374/E11.015 |
| 2008/0068586 A1 * | 3/2008 | Kishida | G01D 5/35364 374/E11.015 |
| 2008/0291431 A1 * | 11/2008 | Wang | G01M 11/3136 356/73.1 |
| 2010/0215326 A1 * | 8/2010 | Zediker | E21B 17/00 385/100 |
| 2011/0090936 A1 * | 4/2011 | Kupershmidt | G01K 11/32 374/E11.015 |
| 2011/0228255 A1 * | 9/2011 | Li | G01B 11/18 356/32 |
| 2013/0113629 A1 | 5/2013 | Hartog | |
| 2014/0140691 A1 * | 5/2014 | Reaves | H04B 10/572 398/21 |
| 2014/0362367 A1 * | 12/2014 | Chen | G01M 11/3145 356/73.1 |
| 2017/0010385 A1 | 1/2017 | Englich | |
| 2017/0059427 A1 | 3/2017 | Bunse | |
| 2017/0176221 A1 * | 6/2017 | Hartog | G01D 5/35364 |
| 2017/0230111 A1 * | 8/2017 | Vilá | H04Q 11/0005 |
| 2017/0299463 A1 * | 10/2017 | Lecoeuche | G01M 11/3127 |
| 2018/0073959 A1 * | 3/2018 | Lecoeuche | G01D 5/35361 |
| 2018/0274953 A1 | 9/2018 | Molteni | |
| 2020/0124497 A1 * | 4/2020 | Furukawa | G01D 5/35306 |
| 2020/0244353 A1 * | 7/2020 | Mutalik | H04B 10/071 |
| 2020/0408574 A1 * | 12/2020 | Waagaard | G01D 5/35354 |
| 2021/0223139 A1 * | 7/2021 | Hveding | G01M 11/3145 |
| 2022/0216925 A1 | 7/2022 | Jander | |
| 2022/0247488 A1 * | 8/2022 | Jiang | G01H 9/004 |
| 2022/0278748 A1 * | 9/2022 | Yaman | H01S 3/06716 |
| 2023/0073827 A1 | 3/2023 | Russell | |

OTHER PUBLICATIONS

Xia Gao et al., "Single-Fiber-Based Brillouin Optical Time Domain Analysis With Far-End Modulation", Journal of Lightwave Technology, IEEE, USA, vol. 39, No. 11, Mar. 26, 2021, pp. 3607-3613.

\* cited by examiner

OPTICAL TIME-DOMAIN REFLECTOMETER (OTDR) INCLUDING CHANNEL CHECKER

RELATED APPLICATION

The present application is a divisional under 35 U.S.C. § 120 of co-pending U.S. patent application Ser. No. 17/736,273, filed May 4, 2022, and claims priority under 35 U.S.C. 119(a)-(d) to European patent application number 21306326.6, having a filing date of Sep. 24, 2021, the disclosures of which are hereby incorporated by reference in their entireties.

BACKGROUND

An optical time-domain reflectometer (OTDR) is an optoelectronic instrument used to characterize an optical fiber. The OTDR may inject a series of optical pulses into an optical fiber under test. Based on the injected optical pulses, the OTDR may extract, from the same end of the optical fiber in which the optical pulses are injected, light that is scattered or reflected back from points along the optical fiber. The scattered or reflected light that is gathered back may be used to characterize the optical fiber. For example, the scattered or reflected light that is gathered back may be used to detect, locate, and measure events at any location of the optical fiber. The events may include faults at any location of the optical fiber. Other types of features that may be measured by the OTDR include attenuation uniformity and attenuation rate, segment length, and location and insertion loss of connectors and splices.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
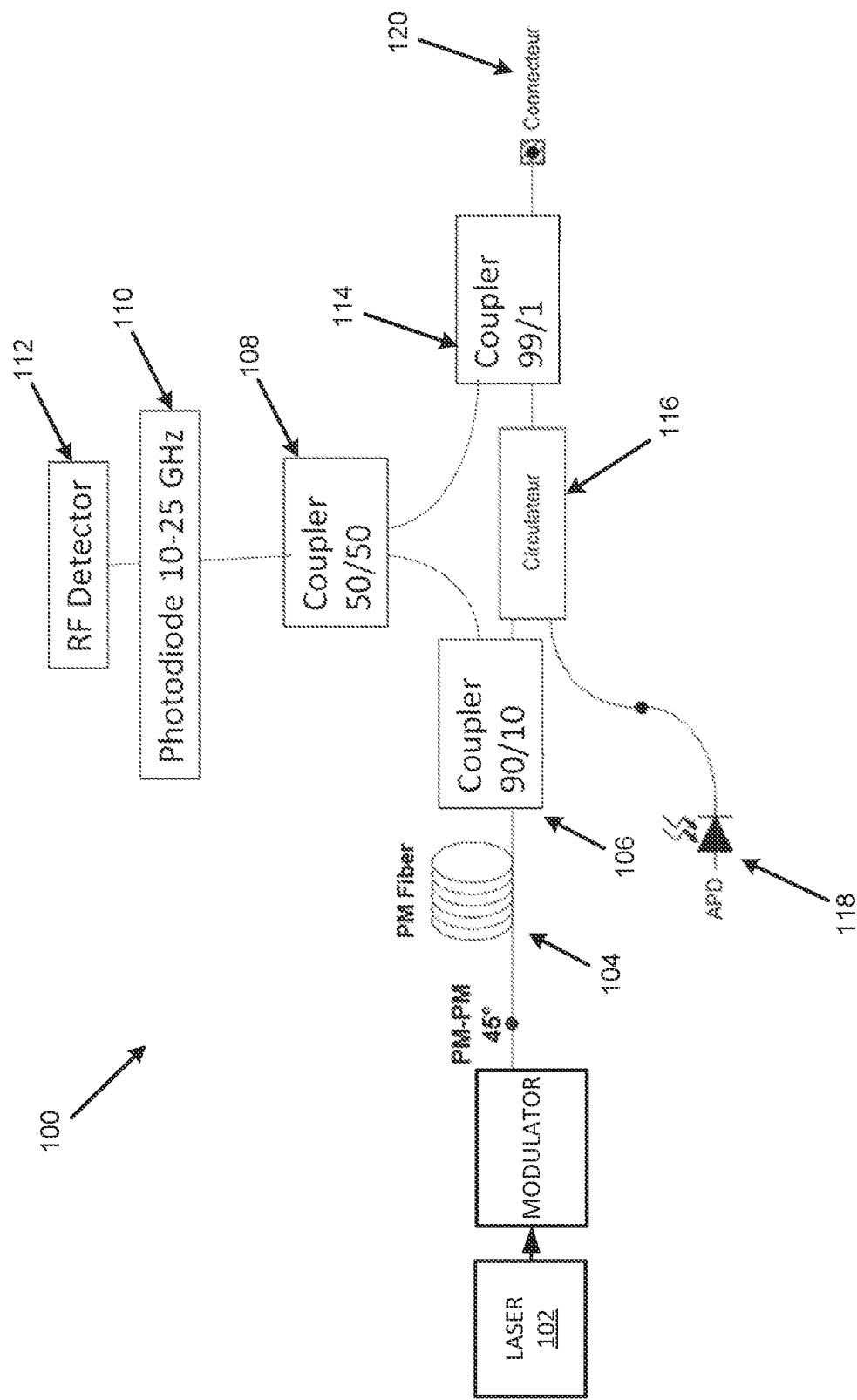
FIG. 1 illustrates an architecture of an OTDR including a channel checker (hereinafter also referred to as "channel checker OTDR"), according to an example of the present disclosure.

For simplicity and illustrative purposes, the present disclosure is described by referring mainly to examples thereof. In the following description, details are set forth in order to provide an understanding of the present disclosure. It will be readily apparent however, that the present disclosure may be practiced without limitation to these details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to examples of the present disclosure, an optical time-domain reflectometer (OTDR) including a channel checker (hereinafter also referred to as "channel checker OTDR") may utilize a tunable narrow linewidth laser. In this regard, the channel checker OTDR may include combined channel checker and OTDR functionality for dense wavelength division multiplexing (DWDM) network testing. The DWDM OTDR may utilize narrow linewidth lasers that may also be utilized for coherent detection of live traffic on a test port. The channel checker OTDR may mix a small portion of the signal from a device under test (e.g., an optical fiber) with a portion of a tunable laser acting as a local oscillator, and detect the beat terms with a high speed photodiode. A depolarizer at an output of the laser may reduce polarization dependent noises on OTDR traces, and serve as a means to reduce the strong polarization dependency of coherent detection. In this regard, the coherent detection may provide additional sensitivity and selectivity against direct detection. In some examples, a complete polarization diversity reception may either be used for reflectometric purposes, for a channel checker, or even for a fully featured High Resolution Optical Spectrum Analyzer (HROSA). A channel checker may display a power reading present at predefined wavelength ranges, corresponding to channels on the WDM grid, whereas the HROSA may display the spectrum with fine details.

With respect to OTDRs generally, in some applications, both an OTDR and a spectrum analyzer/channel checker may be utilized, with both devices operating in the same wavelength bands. In one example, a tunable filter may be utilized to provide for OTDR testing by cleaning out the spectrum of a laser. In another example, for OTDR testing, alien signals present on a fiber may be filtered, directing only the OTDR laser wavelength toward the receiver. In a further example, with respect to Optical Spectrum Analyzer (OSA) channel checker functionality, any wavelength coming from the DUT may be selectively filtered, which, combined with an OTDR Avalanche Photodiode (APD) or an additional p-i-n (PIN) photodiode, provides the basis for a spectral analysis. The losses of the tunable filter (~3-4 dBs) may directly affect the OTDR dynamic range, and in this regard, it is technically challenging to implement a channel checker with low loss, and to implement a 50 GHz grid capability for the OSA in a compact solution.

The channel checker OTDR disclosed herein may overcome at least the aforementioned technical challenges by including a channel checker without impacting the performance and cost of the channel checker OTDR, as well as achieving a 50 GHz grid capability.

According to examples disclosed herein, for the channel checker OTDR, only a relatively small percentage of signals may be extracted from a test port to thus limit losses associated with the OTDR.

According to examples disclosed herein, for the channel checker OTDR, a coherent detection may provide high sensitivity.

According to examples disclosed herein, for the channel checker OTDR, the coherent detection may provide high spectral resolution, for example, at 50 GHZ.

In some examples, the channel checker OTDR may scan two laser beams over a wavelength range with a maintained frequency shift between the two laser beams. For example, the two laser beams may be set with an offset frequency shift. According to an example, the range of the offset frequency shift for the Rayleigh trace determination may include frequencies between approximately 100.0 KHz to approximately 1 GHz. For example, the offset frequency shift may be set at approximately 240 MHz. According to an example, the wavelength range may include a range of 10's of GHz (e.g., 15 GHz) to several THz (e.g., 50 THz). A first laser beam may be modulated with an external modulator. The modulated laser beam may be injected into the DUT. For example, the DUT may include an optical fiber. A backscattered signal from the DUT may be acquired by the coherent receiver. The backscattered signal may be mixed with the second laser beam that is used as a local oscillator. A sensor controller may perform various functions as disclosed herein with respect to Rayleigh trace determination. For example, the sensor controller may perform averaging of repeated acquisitions while scanning the two laser beams in order to reduce coherent fading noises. The coherent detection at the predetermined offset frequency shift yields the Rayleigh trace. The Rayleigh trace may be used to identify anomalies in transmission of a signal along the DUT.

FIG. 1 illustrates an architecture of an OTDR including a channel checker (hereinafter referred to as "channel checker OTDR 100"), according to an example of the present disclosure. Referring to FIG. 1, the channel checker OTDR 100 may include laser 102. As shown in FIG. 1 (and similarly in FIGS. 2 and 3), the modulator may be optional in case of a direct pulsing of the laser diode, or be an Acousto-Optic-Modulator, a Semiconductor Optical Amplifier (SOA), an Electro-Optic-Modulator, or an Electro-Absorption-Modulator, with a pulsed drive. In some examples, the laser 102 may include a CW laser with a pulsed SOA. The laser 102 may inject a laser beam into Polarization Maintaining (PM) fiber 104, which may be input to a coupler 106. The coupler 106 may be a 90/10 coupler. The coupler 106 may be optically connected to a coupler 108, which may be a 50/50 coupler. The coupler 108 may receive input from a photodiode 110, which may receive input from a radio frequency (RF) detector 112. The photodiode 110 may be a 10-25 GHz photodiode. Outputs of the coupler 108 may be fed to coupler 106, and to a coupler 114, which may be a 99/1 coupler. The coupler 114 may receive input from a circulator 116, which may be optically connected to an avalanche photodiode (APD) 118. Output of the coupler 114 may be connected to a connector 120, which may be connected to a device under test (DUT) such as an optical fiber (not shown).

In the OTDR mode, the light pulse generated by the laser 102 may be launched with polarization state at 45° with respect to the PM fiber 104 Eigen axis. As the laser 102 wavelength is scanned, the polarization state at the output of the PM fiber 104 will rotate, and the polarization dependent loss related errors may be reduced. The largest portion of the light pulse may then be directed towards the fiber under test plugged at connector 120 (e.g., path through the coupler 106, circulator 116 and coupler 114). The backscattered light from fiber under test may then be directed to the APD 118 by means of the circulator 116.

In the channel checker mode, the smaller portion of the light from the laser 102 directed by the coupler 106 toward the photodiode 110 may be utilized as a local oscillator. Live signals present in the fiber under test plugged at connector 120 may also be directed to the photodiode 110, through the coupler 114, and are mixed with local oscillator at coupler 108. Beat terms signals from the high speed photodiode may be passed to the RF detector 112, and the output may be sampled with a converter. The sampled signal may be proportional to the power of the beat terms, which may be themselves proportional to the power of the live signals around the frequency of the local oscillator (e.g., optical bandwidth is equal to twice the electrical bandwidth of the photodiode). Alternatively, based on sampling and processing speeds, the beat signals may be sampled directly and processed numerically.

The channel checker OTDR 100 may send continuous-wave (CW) light into the network during operation as a channel checker. The same light may cause backscattering, and be detected by coherent detection (where scan/time delay=frequency shift=beat term).

Figure 2:
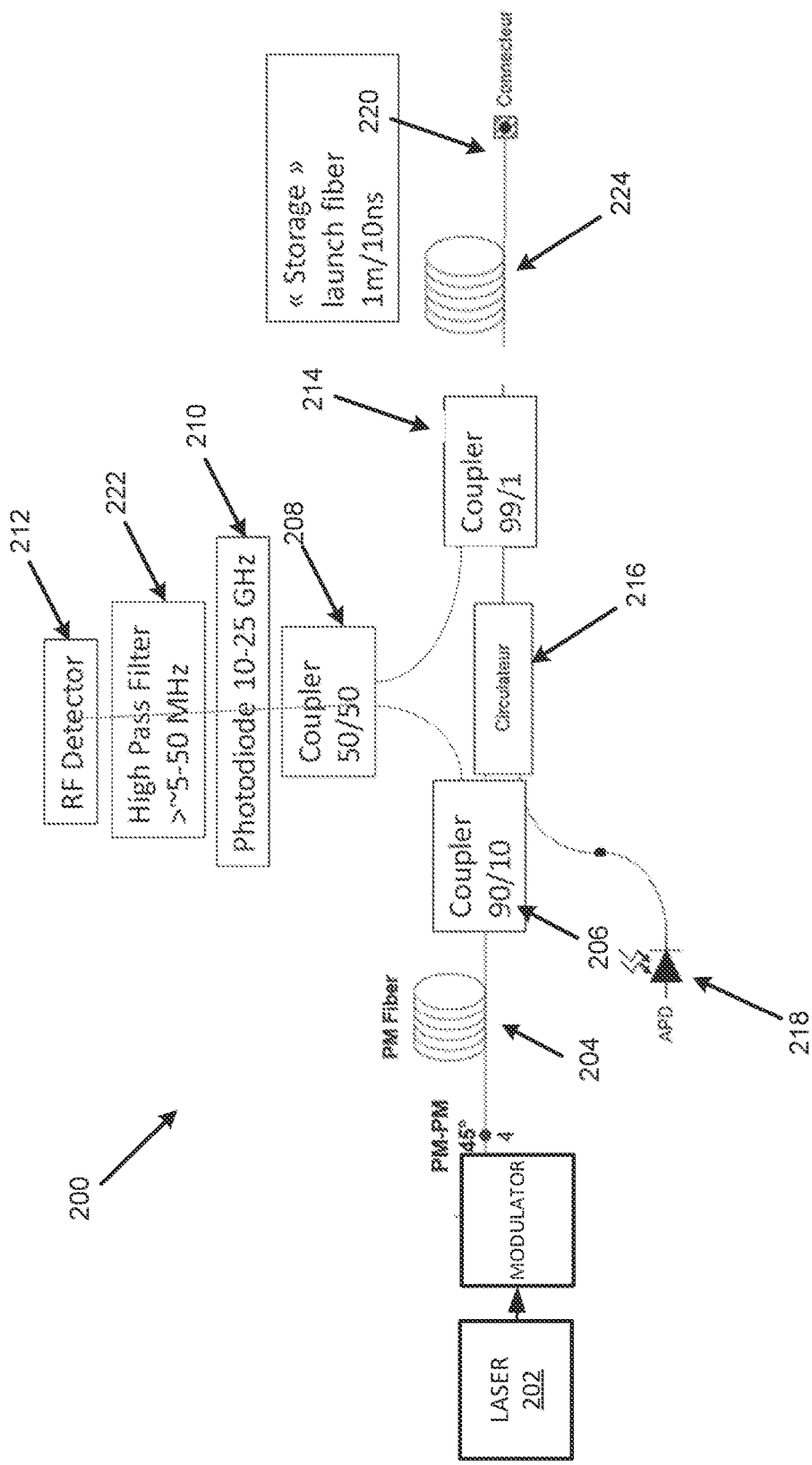
FIG. 2 illustrates another example of a channel checker OTDR, according to an example of the present disclosure.

FIG. 2 illustrates another architecture of an OTDR including a channel checker (hereinafter referred to as "channel checker OTDR 200"), according to an example of the present disclosure. Referring to FIG. 2, the channel checker OTDR 200 may include laser 202. The laser 202 may inject a laser beam into PM fiber 204, which may be input to a coupler 206. The coupler 206 may be a 90/10 coupler. The coupler 206 may be optically connected to a coupler 208, which may be a 50/50 coupler. The coupler 208 may be optically connected to a photodiode 210, which may be optically connected to a high pass filter 222 and a RF detector 212. The photodiode 210 may be a 10-25 GHz photodiode. The coupler 208 may be optically connected to the coupler 206, and to a coupler 214, which may be a 99/1 coupler. The coupler 214 may be optically connected to a circulator 216, which may be optically connected to an avalanche photodiode (APD) 218. The coupler 214 may be optically connected to a launch fiber 224, which may be optically connected to a connector 220. The connector 220 may be connected to a DUT such as an optical fiber (not shown).

In the OTDR mode, the light pulse generated by the laser 202 may be launched with the polarization state at 45° with respect to the PM fiber 204 Eigen axis. As the laser 202 wavelength is scanned, the polarization state at the output of the PM fiber 204 rotates, and the polarization dependent loss related errors may be reduced. The largest portion of the light pulse may then be directed towards the fiber under test by the coupler 206, the circulator 216, the coupler 214 and the launch fiber 220. The backscattered light from fiber under test may be directed to the APD 218 by means of the circulator 216.

In the channel checker mode, the smaller portion of laser 202 light directed by the coupler 206 toward the 210 photodiode may be utilized as a local oscillator. Live signals present in the fiber under test may be directed to photodiode 210, go through launch fiber 224, the coupler 214 and are mixed with local oscillator at coupler 208. Beat terms signals from the high speed photodiode may be passed to the RF detector 212, and the output may be sampled with a converter. The sampled signal may be proportional to the power of the beat terms, which are proportional to the power of the live signals around the frequency of the local oscillator (e.g., optical bandwidth is equal to twice the electrical bandwidth of the photodiode). Alternatively, based on sampling and processing speeds, the beat signals may be sampled directly and processed numerically.

For the channel checker OTDR 200, the source laser may be pulsed, and the RF detection may be synchronized to this pulse in such a way that measurement is not perturbed by the light sent into the network through circulator 216. A launch fiber 220 added before the output connector may provide for storage of the pulse into the fiber and avoid detection of the reflectance of this pulse at the instrument output connector added to live signals from fiber under test. With the objective of reducing parasitic signals, which would appear continuously in the case of a limited extinction-ratio on the pulses, a high-pass filter 222 inserted before the RF detector may filter out the low frequency beat-terms of the backscattered or reflected probe laser signals with itself onto the photodiode. Pulses of 50-200 ns may be utilized depending on the RF detector rise-time.

Figure 3:
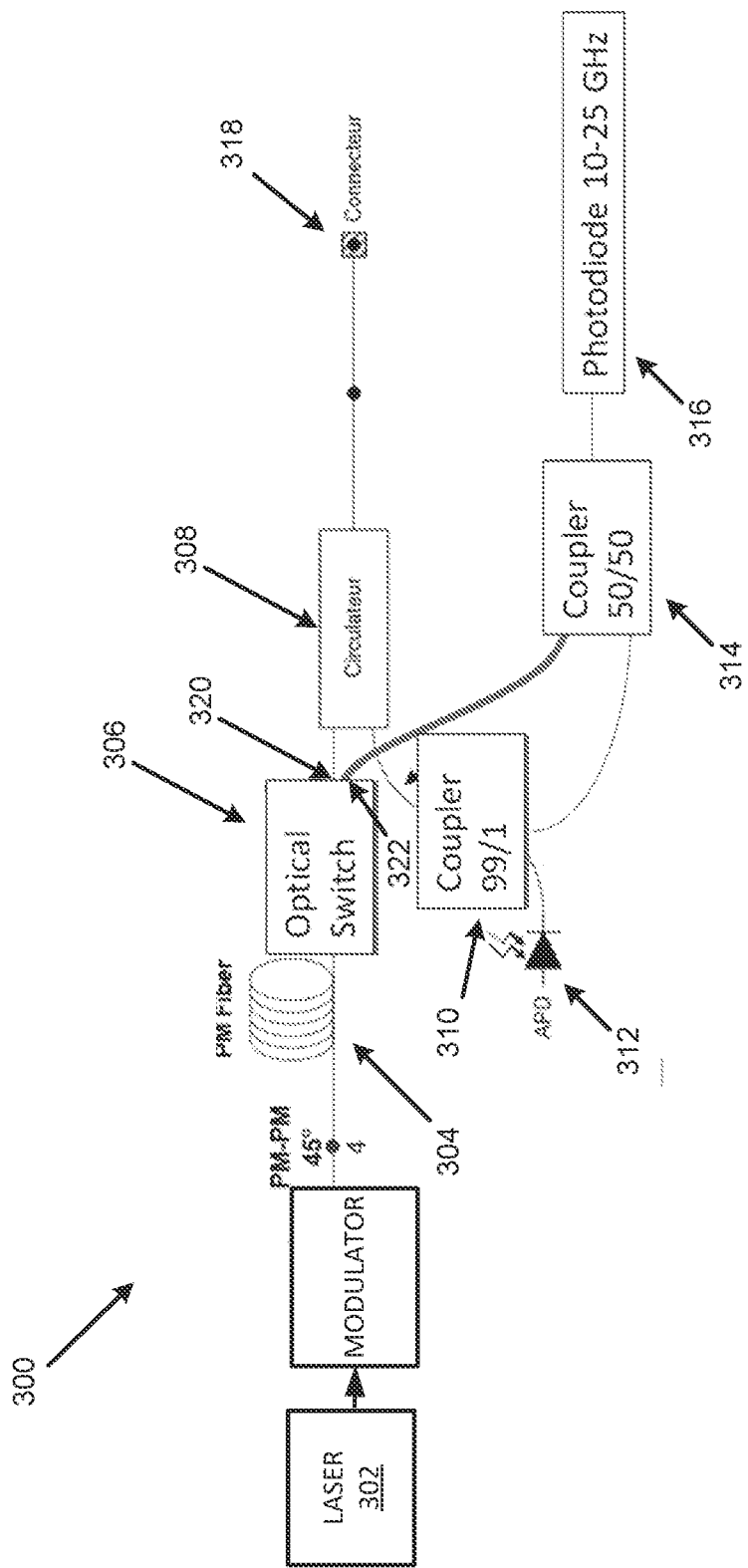
FIG. 3 illustrates another example of a channel checker OTDR, according to an example of the present disclosure.

FIG. 3 illustrates another architecture of an OTDR including a channel checker (hereinafter referred to as "channel checker OTDR 300"), according to an example of the present disclosure. Referring to FIG. 3, the channel checker OTDR 300 may include laser 302, which may include a CW tunable laser as shown. In one example, the CW tunable laser may be combined with a pulsed SOA. The laser 302 may inject a laser beam into Polarization-maintaining (PM) optical fiber 304, which may be input to an optical switch 306. The PM optical fiber 304 may be specified to include length that is sufficient to measure a beat term, such as a few tens of meter long. The optical switch 306 may be optically connected to a circulator 308. The circulator 308 may be optically connected to a coupler 310, which may be a 99/1 coupler. The coupler 310 may be optically connected to an avalanche photodiode (APD) 312. The coupler 310 may be optically connected to a coupler 314, which may be a 50/50 coupler. The coupler 314 may be optically connected to a photodiode 316, which may be a 10-25 GHz photodiode. The coupler 314 may be optically connected to a connector 318. Output of the connector 318 may be connected to a DUT such as an optical fiber (not shown).

In the OTDR mode, the optical switch 306 may direct pulses to its "upper" output port 320. The light pulse generated by the laser 302 may be launched with polarization state at 45° with respect to a PM optical fiber 304 Eigen axis. As the laser 202 wavelength is scanned, the polarization state at the output of the PM optical fiber 304 is rotating, and the polarization dependent loss related errors may be reduced. The light pulse may then be directed towards the fiber under test through the circulator 308. The backscattered light from the fiber under test that is redirected by the circulator 308, and the largest portion thereof may go to the APD 312 through the coupler 310.

In the channel checker mode, the optical switch 306 may direct the continuous wave light of the laser 302 to its "lower" output port 322, coupler 314 and photodiode 316, where it serves as a local oscillator. A small portion of the live signals present in the fiber under test are directed to photodiode 316, followed by the circulator 308, the coupler 310, and are mixed with the local oscillator at the coupler 314.

Figure 4:
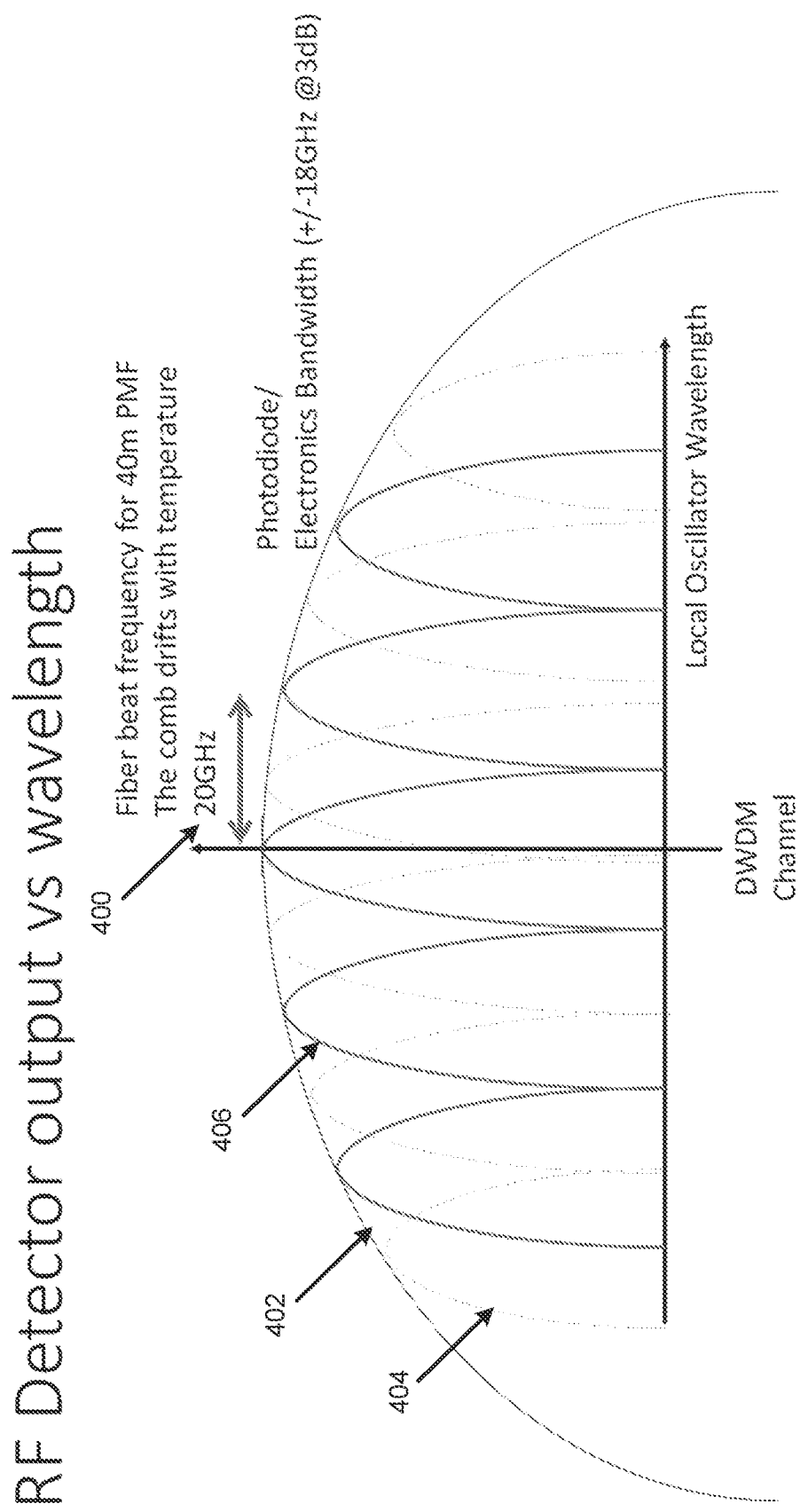
FIG. 4 illustrates a radio frequency detector output versus wavelength to illustrate operation of the channel checker OTDRs of FIGS. 1-3, according to an example of the present disclosure.

FIG. 4 illustrates a radio frequency detector output versus wavelength of the lasers 102, 202 or 302 to illustrate operation of the channel checker OTDRs of FIGS. 1-3, assuming a live channel is present in the center of the scan, according to an example of the present disclosure.

Referring to FIG. 4, the fiber beat frequency for PMF may be specified at 400. In FIG. 4, three traces are presented, the top curve 402 materializes the bandwidth of the photodiode/RF detector, the two oscillating curves 404 and 406 illustrate the expected RF detector output while scanning the wavelength of the local oscillator. The curve 406 may correspond to a particular case where the polarization state of the local oscillator coincides with one of the channels, when at its wavelength. The curve 404 corresponds to another situation where the polarization of the local oscillator is orthogonal to one of the channels, when at its wavelength. While the delay in the PMF may be precisely controlled by controlling the temperature of this fiber, in some examples such as a field application and a channel checker function, the delay may be allowed to drift with the internal temperature of the instrument, so that the phase of the oscillating pattern is considered as a random and unknown parameter. In other examples, the delay of the PMF may be set so that typically one period of the beat pattern is of the same order of magnitude as the detector bandwidth, and therefore, several peaks for each channel may be detected. In this manner, based on an assessment of the situation (e.g., resonant, anti-resonant or intermediate), a correction may be applied to the peak power estimate, based on the knowledge of the photodiode response profile and where the peak was detected on this profile. The detection bandwidth may be smaller than the channel spacing of the live channels so that recorded signals from adjacent channels are not mixed. The precise value of the bandwidth and the PMF delay may be tuned to allow the analysis of a specific DWDM grid and channel modulation format.

Figure 5:
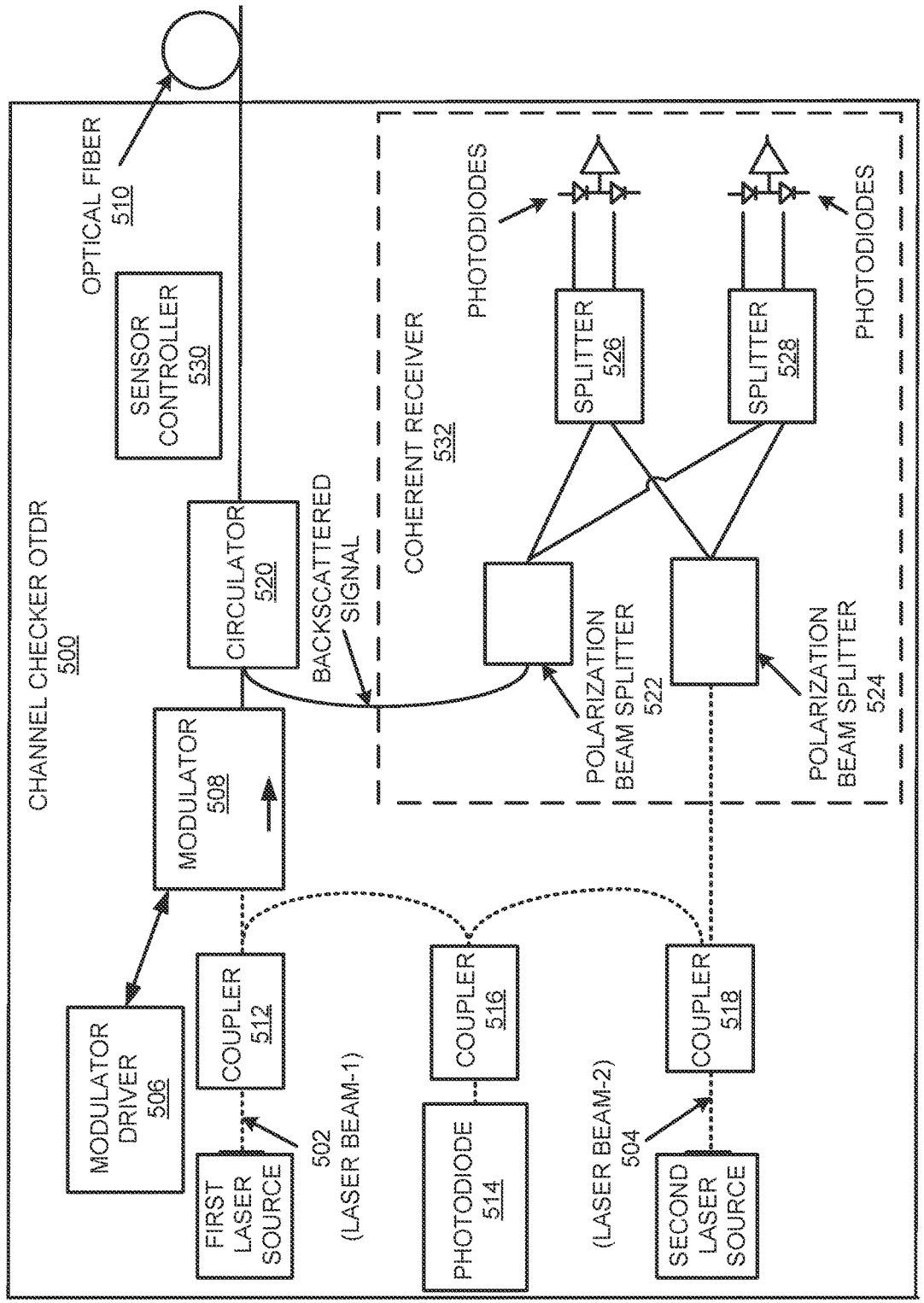
FIG. 5 illustrates another example of a channel checker OTDR, according to an example of the present disclosure.

FIG. 5 illustrates another example of a channel checker OTDR 500, according to an example of the present disclosure.

Referring to FIG. 5, the channel checker OTDR 500 may include a first laser source that emits a first laser beam at 502 and a second laser source that emits a second laser beam at 504. The first laser beam and the second laser beam may be respectively designated as Laser Beam-1 and Laser Beam-2. Each of the laser sources may be a distributed feedback (DFB) laser source. A DFB laser source may be described as an optical fiber laser source where the active region of the laser source is periodically structured as a diffraction grating.

In some examples, the layout of FIG. 5 may be designated as a fully featured high dynamic range C-OTDR and high-resolution spectrum analyzer.

A modulator driver 506 may drive a modulator 508. The modulator 508 may modulate the Laser Beam-1. The modulator 508 may be an external modulator. Examples of the modulator 508 include an AOM (Acousto-Optic Modulator), EOM (Electro-Optic Modulator), or SOA (Semiconductor Optical Amplifier). The modulator 508 may modulate the Laser Beam-1, for example, between a range of 1 ns to 20 μs. The modulator 508 may be intermediately disposed between the Laser Beam-1 and an optical fiber 510. The modulator 508 may provide for amplification of the optical signal from a coupler 512. That is, the modulator 508 may provide high optical gain with respect to the optical signal from the coupler 512 over a wide wavelength range.

A photodiode 514 may be connectively disposed between the Laser Beam-1 and the Laser Beam-2. The photodiode 514 may measure the frequency of the beat between the Laser Beam-1 and the Laser Beam-2. The frequency of the beat between the Laser Beam-1 and the Laser Beam-2 may be used to set a predetermined offset frequency shift between the Laser Beam-1 and the Laser Beam-2. With respect to the predetermined offset frequency shift, the photodiode 514 may provide a signal proportional to the intensity of an optical field. The optical field may be composed of two monochromatic optical signals in the same linearly polarized state, with a frequency difference between the Laser Beam-1 and the Laser Beam-2 within the response bandwidth of the photodiode 514. The two field interferences may produce a beat frequency at this frequency, which is observable in the output signal of the photodiode 514.

Couplers 512, 516, and 518 may be connected to the Laser Beam-1, photodiode 514, and the Laser Beam-2. The couplers 512, 516, and 518 may include 1×2 couplers as shown in FIG. 5. For example, the coupler 512 provides fiber optic coupling for the transmission to the modulator 508 and the coupler 516. The coupler 512 may be designated as a 90/10 coupler, where 90% of the laser beam is directed to the modulator 508, and 10% of the laser beam is directed to the photodiode 514. Coupler 516 may be designated as a 50/50 coupler, and coupler 518 may be designated as a 90/10 coupler.

A circulator 520 may be intermediately disposed between the modulator 508 and the optical fiber 510. The circulator 520 may receive the amplified laser beam from the modulator 508, and direct the amplified laser beam to the optical fiber 510. Further, the circulator 520 may receive the backscattered signal from the optical fiber 510.

A polarization beam splitter (PBS) 522 may be used to receive the backscattered signal from the optical fiber 510 via the circulator 520. The PBS 522 may separate the backscatter signal into two different polarization beams. That is, because the backscattered light from the optical fiber 510 is at an unknown polarization state, the PBS 522 may divide the backscattered light into two polarization states. The polarization states may represent projections over two polar states. The two polar sates may represent S-polarized light and P-polarized light. The S-polarization refers to light that is polarized perpendicularly to the plane of incidence. The P-polarization refers to light that is polarized parallel to the plane of incidence.

A PBS 524 may be used to receive the Laser Beam-2. The PBS 524 may separate the Laser Beam-2 into two different polarization beams.

Output from the PBS 522 may be separated between splitters 526 and 528. At splitter 526, S-polarized light may be mixed with the S-polarized Laser Beam-2. At splitter 528, P-polarized light may be mixed with the P-polarized Laser Beam-2.

The outputs from the splitters 526 and 528 may be directed to photodiodes. The splitters 526 and 528 may include 2×2 splitters. The splitters 526 and 528 may be 50/50 splitters where 50% of the backscattered signal and 50% of the laser beam at the correct polarization is directed to the corresponding photodiodes.

A sensor controller 530 may operate in conjunction with a coherent receiver 532 to determine the Brillouin trace and the Rayleigh trace as disclosed herein. The coherent receiver 532 may include the PBS 522, the PBS 524, the splitters 526 and 528, and the photodiodes.

When operated for spectral analysis, the second laser source may be used as a local oscillator and beat with the live signals from the optical fiber 510, and the first laser source will be off. With this polarization diversity scheme, the sum of the beat terms on the two polarizations is proportional to the optical power present at the local oscillator wavelength. Low bandwidth photodiodes (<GHz) may be used in this scheme, which will result in a high resolution spectral analysis. The channel checker OTDR 500 may be considered as an optical spectrum analyzer, where spectral traces can be presented (as opposed to the channel checker OTDRs 100, 200, and 300) where the spectra recorded are distorted by the polarization rotation technique and may retrieve a channel power within a comparatively coarse frequency range.

The Rayleigh trace or the Brillouin trace may represent the temporal evolution of optical power at the corresponding optical frequency or range of frequencies, acquired synchronously after each pulse. The electrical signals generated by the photodiodes of the coherent receiver 532 may reflect beat frequencies of the backscattered fields with the local oscillator. The bandwidth of the photodiodes of the coherent receiver 532, electrical amplification, and analogue to digital conversion may set some frequency limits to the optical signals that may be acquired. The accessible optical frequency range is then comprised between the frequency of the optical oscillation plus or minus a global electrical bandwidth. The electrical signals generated by the photodiodes of the coherent receiver 532 may be processed to further reduce the range of accessible frequencies, for example, by analogue or digital filters, which may be low-pass and band-pass filters. The electrical signals generated by the photodiodes of the coherent receiver 532 are proportional to the field of the optical backscattered signal, and may be processed by analogue or digital techniques in order to determine a power. For example, a digital squaring and averaging procedure may yield the effective power.

With respect to the Brillouin trace, the Laser Beam-1 and the Laser Beam-2 may be set to an offset frequency shift within a range of approximately 10.0 GHz-13.0 GHz. For example, the Laser Beam-1 and the Laser Beam-2 may be set to approximately 10.8 GHz offset frequency shift. With such a value of the frequency shift, a coherent detection at low frequencies (e.g., around zero frequency) may yield the Brillouin trace. In this regard, a low-pass filter may be used with respect to the Brillouin trace determination.

With respect to the Rayleigh trace, the Laser Beam-1 and the Laser Beam-2 may be set with an offset frequency shift. The coherent detection at this same frequency yields the Rayleigh trace. For example, with respect to the Rayleigh trace, the Laser Beam-1 and the Laser Beam-2 may be set to an offset frequency shift within a range of approximately 100.0 KHz to approximately 1.0 GHz. According to an example, with respect to the Rayleigh trace, the Laser Beam-1 and the Laser Beam-2 may be set to an offset frequency shift of approximately 240 MHz. In this regard, a band-pass filter may be used with respect to the Rayleigh trace determination.

Operation of the channel checker OTDR 500 for Brillouin trace determination is described with reference to FIG. 5.

With respect to Brillouin trace determination, the channel checker OTDR 500 may maintain a predetermined offset frequency shift between the Laser Beam-1 and the Laser Beam-2. For example, the Laser Beam-1 and the Laser Beam-2 may be set to approximately 10.8 GHz offset frequency shift. For example, the Laser Beam-1 may be set to a predetermined frequency of 193 THz and an offset frequency shift of 10.8 GHz, and the Laser Beam-2 may be set to the predetermined frequency of approximately 193 THz. When the Laser Beam-1 and the Laser Beam-2 are shifted at a high frequency of approximately 10.8 GHz, the backscattered light returning from the optical fiber 510 is approximately at a frequency of the Laser Beam-2, which provides for Brillouin detection.

The Laser Beam-1 may be modulated with the modulator 508.

The modulated Laser Beam-1 may be injected into the DUT. For the example of FIG. 5, the DUT may include the optical fiber 510.

The backscattered signal from the optical fiber 510 may be acquired with the coherent receiver 532. At the coherent receiver 532, the Laser Beam-2 may be used as a local oscillator.

The acquisitions of the backscattered signal may be repeated for various frequency shifts between the two laser beams in order to sample the distributed Brillouin spectra. For example, assuming that a Brillouin trace is determined at approximately 10.8 GHz, the acquisitions may be acquired for various frequency shifts in the range of approximately 10.7 GHz to 10.9 GHz in increments of 1.0-10.0 MHz.

A coherent detection at low frequencies (e.g., around zero frequency), with laser beam frequency shift set at 10.8 GHz yields the Brillouin trace.

The resonant Brillouin frequency shift along the optical fiber 510 may be determined from the distributed Brillouin spectra. The resonant Brillouin frequency shift along the optical fiber 510 may be determined by fitting the distributed Brillouin spectra. Further, the integrated Brillouin power may be determined from the distributed Brillouin spectra. For example, the integrated Brillouin power may be determined from the distributed Brillouin spectra by applying an integration operation to the distributed Brillouin spectra. The resonant Brillouin frequency shift along the optical fiber 510 and the integrated Brillouin power may be used to determine the mechanical strain and temperature along the optical fiber 510. The combined information of Brillouin power, Rayleigh power and Brillouin frequency shift allows for the discrimination of temperature and strain. In reflectometric applications, the Brillouin power trace may be advantageous against the Rayleigh trace, as the Brillouin trace is exempt of the large Fresnel reflections and the associated dead zones.

Operation of the channel checker OTDR 500 for Rayleigh trace determination is described with reference to FIG. 5.

With respect to the Rayleigh trace determination, for the channel checker OTDR 500, the Laser Beam-1 and the Laser Beam-2 may be scanned over a wavelength range with a maintained frequency shift between the two laser beams. With respect to the Rayleigh trace determination, the offset frequency shift may include frequencies within a range of approximately 100.0 KHz to approximately 1 GHz. For example, the Laser Beam-1 and the Laser Beam-2 may be set to a predetermined frequency of approximately 193 THz, with a 240 MHz offset frequency shift specified for the Laser Beam-1. Thus, at low frequency shifts, the Rayleigh trace may be determined. The scanning of the Laser Beam-1 and the Laser Beam-2 over a wavelength range with a maintained frequency shift between the two laser beams may be used to continuously tune the laser sources for the Laser Beam-1 and the Laser Beam-2.

The Laser Beam-1 may be modulated with the modulator 508.

The modulated Laser Beam-1 may be injected into the DUT. For the example of FIG. 5, the DUT may include the optical fiber 510.

The backscattered signal from the optical fiber 510 may be acquired with the coherent receiver 532. At the coherent receiver 532, the Laser Beam-2 may be used as a local oscillator.

The acquisitions of the backscattered signal may be repeated at the same predetermined offset frequency shift. For the Rayleigh traces the repeated acquisitions may be averaged while scanning the two laser beams in order to reduce coherent fading noises. Thus the coherent detection at the offset frequency shift yields the Rayleigh trace, where the range of possible frequencies includes approximately 100.0 KHz to approximately 1 GHz. The Rayleigh trace may represent the Rayleigh power as function of time or distance along the optical fiber 510.

The channel checker OTDR 500 may provide for polarization diversity, and balanced detection (e.g., for a better sensitivity/rejection). The channel checker OTDR 500 may provide a tunable Coherent-OTDR. In this regard, the channel checker OTDR 500 may provide for improved dynamic range (e.g., 50 dB equivalent). The channel checker OTDR 500 may be natively resilient to live signals over a DUT, and natively resilient to its own laser amplified spontaneous emission (ASE) (e.g., problems encountered with direct detection, injection on a common port, and strong reflectances from all demultiplexer ports). The channel checker OTDR 500 may diminish the contrast on all OTDR signals such as reflectance, losses of splitter, losses of fiber (dBs divided by two). The channel checker OTDR 500 may include HROSA functionalities. For the channel checker OTDR 500, the first laser source that emits a first laser beam at 502 may serve as a fixed absolute referential if lockable at specific wavelength of the telecom grid (for example, lasers following the Integrable Tunable Laser Assembly Multi Source Agreement may be used), then the photodiode 514, with selected RF filters providing relative trigger signals, while the second laser source that emits a second laser beam at 504 is being scanned for spectral analysis.

Figure 6:
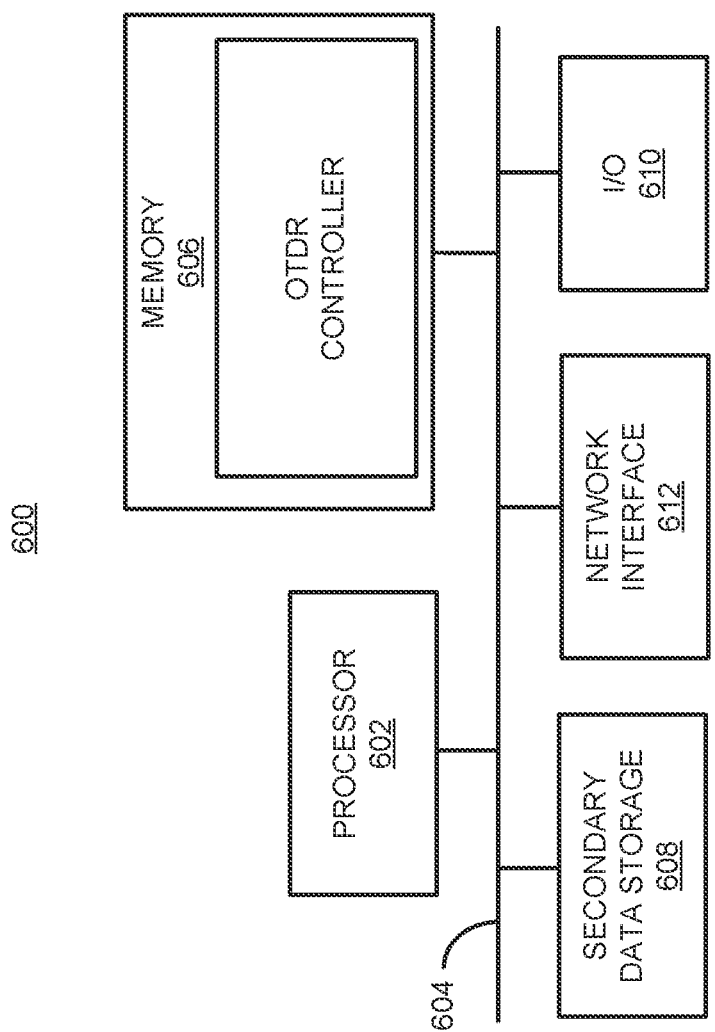
FIG. 6 illustrates a computer system, according to an example of the present disclosure.

FIG. 6 shows a computer system 600 that may be used with the examples described herein. The computer system may represent a generic platform that includes components that may be in a server or another computer system. The computer system 600 may be used as part of a platform for a controller of the channel checker OTDR (e.g., OTDR controller as shown in FIG. 6). The computer system 600 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 600 may include a processor 602 that may implement or execute machine readable instructions performing some or all of the methods, functions and other processes described herein. Commands and data from the processor 602 may be communicated over a communication bus 604. The computer system may also include a main memory 606, such as a random access memory (RAM), where the machine readable instructions and data for the processor 602 may reside during runtime, and a secondary data storage 608, which may be non-volatile and stores machine readable instructions and data. The memory and data storage are examples of computer readable mediums. The memory 606 may include the OTDR controller including machine readable instructions residing in the memory 606 during runtime and executed by the processor 602.

The computer system 600 may include an I/O device 610, such as a keyboard, a mouse, a display, etc. The computer system may include a network interface 612 for connecting to a network. Other known electronic components may be added or substituted in the computer system.

The processor 602 may be designated as a hardware processor. The processor 602 may execute operations associated with various components of the OTDR including a channel checker 100. For example, the processor 602 may execute operations associated with the OTDR controller, etc.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A channel checker optical time-domain reflectometer (OTDR) comprising:
   a first laser source to emit a first laser beam;
   a second laser source to emit a second laser beam;
   a first photodiode to acquire a beat frequency between the first laser beam and the second laser beam, wherein the beat frequency is used to maintain a predetermined offset frequency shift between the first laser beam and the second laser beam, wherein the predetermined offset frequency shift is relative to a predetermined frequency of either the first laser beam or the second laser beam;
   a modulator to modulate the first laser beam, wherein the modulated first laser beam is to be injected into a device under test (DUT);
   a coherent receiver to acquire a backscattered signal from the DUT, wherein the backscattered signal results from the modulated first laser beam injected into the DUT, and wherein the coherent receiver is to determine Brillouin traces and Rayleigh traces with respect to the DUT based on the predetermined offset frequency shift between the first laser beam and the second laser beam;
   a second photodiode to receive a portion of light from the second laser beam to enable detection of beat terms signals;
   a tunable filter optically coupled to the second photodiode; and
   a radio frequency (RF) detector optically coupled to the tunable filter, wherein the beat terms signals are selectively passed to the RF detector to detect live traffic on the DUT.

2. The channel checker OTDR of claim 1, wherein the predetermined offset frequency shift for determination of the Brillouin traces is approximately 10.8 GHz.

3. The channel checker OTDR of claim 1, wherein the predetermined offset frequency shift for determination of the Brillouin traces is selected from a range of approximately 10.0 GHz to approximately 13.0 GHz.

4. The channel checker OTDR of claim 1, wherein the predetermined offset frequency shift for determination of the Rayleigh traces is selected from a range of approximately 100.0 KHz to approximately 1.0 GHz.

5. The channel checker OTDR of claim 1, wherein the DUT is an optical fiber.

6. The channel checker OTDR of claim 1, further comprising:
   a polarization beam splitter (PBS) of the coherent receiver to
      receive the backscattered signal, and
      divide the backscattered signal into two different polarization states, wherein
         a divided portion of the backscattered signal corresponding to a first polar state is to be mixed with the second laser beam at the first polar state, and
         a divided portion of the backscattered signal corresponding to a second polar state is to be mixed with the second laser beam at the second polar state to determine the Brillouin traces and the Rayleigh traces with respect to the DUT.

7. A channel checker optical time-domain reflectometer (OTDR) comprising:
   a first laser source to emit a first laser beam;
   a second laser source to emit a second laser beam;
   a first photodiode to acquire a beat frequency between the first laser beam and the second laser beam, wherein the beat frequency is used to maintain a predetermined offset frequency shift between the first laser beam and the second laser beam;
   a modulator to modulate the first laser beam, wherein the modulated first laser beam is to be injected into a device under test (DUT);
   a coherent receiver to acquire a backscattered signal from the DUT, wherein the backscattered signal results from the modulated first laser beam injected into the DUT;
   a second photodiode to receive a portion of light from the second laser beam to enable detection of beat terms signals;
   a tunable filter optically coupled to the second photodiode; and
   a radio frequency (RF) detector optically coupled to the tunable filter, wherein the beat terms signals are selectively passed to the RF detector to detect live traffic on the DUT.

8. The channel checker OTDR of claim 7, wherein the coherent receiver is to use the second laser beam as a local oscillator to determine Brillouin traces and Rayleigh traces with respect to the DUT based on the predetermined offset frequency shift between the first laser beam and the second laser beam.

9. The channel checker OTDR of claim 8, wherein the predetermined offset frequency shift for determination of the Brillouin traces is approximately 10.8 GHz.

10. The channel checker OTDR of claim 8, wherein the predetermined offset frequency shift for determination of the Brillouin traces is selected from a range of approximately 10.0 GHz to approximately 13.0 GHz.

11. The channel checker OTDR of claim 8, wherein the predetermined offset frequency shift for determination of the Rayleigh traces is selected from a range of approximately 100.0 KHz to approximately 1.0 GHz.

12. The channel checker OTDR of claim 8, further comprising:
   a polarization beam splitter (PBS) of the coherent receiver to
      receive the backscattered signal, and
      divide the backscattered signal into two different polarization states, wherein
         a divided portion of the backscattered signal corresponding to a first polar state is to be mixed with the second laser beam at the first polar state, and
         a divided portion of the backscattered signal corresponding to a second polar state is to be mixed with the second laser beam at the second polar state to determine the Brillouin traces and the Rayleigh traces with respect to the DUT.

13. The channel checker OTDR of claim 7, wherein the DUT is an optical fiber.

14. A channel checker optical time-domain reflectometer (OTDR) comprising:
   a first photodiode to acquire a beat frequency between a first laser beam and a second laser beam, wherein the beat frequency is used to maintain a predetermined offset frequency shift between the first laser beam and the second laser beam;

a modulator to modulate the first laser beam, wherein the modulated first laser beam is to be injected into a device under test (DUT);

a coherent receiver to acquire a backscattered signal from the DUT;

a second photodiode to receive a portion of light from the second laser beam to enable detection of beat terms signals;

a tunable filter optically coupled to the second photodiode; and a radio frequency (RF) detector optically coupled to the tunable filter, wherein the beat terms signals are selectively passed to the RF detector to detect live traffic on the DUT.

15. The channel checker OTDR of claim 14, wherein the backscattered signal results from the modulated first laser beam injected into the DUT, and wherein the coherent receiver is to use the second laser beam as a local oscillator to determine Brillouin traces and Rayleigh traces with respect to the DUT based on the predetermined offset frequency shift between the first laser beam and the second laser beam.

16. The channel checker OTDR of claim 15, wherein the predetermined offset frequency shift for determination of the Brillouin traces is approximately 10.8 GHz.

17. The channel checker OTDR of claim 15, wherein the predetermined offset frequency shift for determination of the Brillouin traces is selected from a range of approximately 10.0 GHz to approximately 13.0 GHz.

18. The channel checker OTDR of claim 15, wherein the predetermined offset frequency shift for determination of the Rayleigh traces is selected from a range of approximately 100.0 KHz to approximately 1.0 GHz.

19. The channel checker OTDR of claim 15, further comprising:

a polarization beam splitter (PBS) of the coherent receiver to
receive the backscattered signal, and
divide the backscattered signal into two different polarization states, wherein a divided portion of the backscattered signal corresponding to a first polar state is to be mixed with the second laser beam at the first polar state, and a divided portion of the backscattered signal corresponding to a second polar state is to be mixed with the second laser beam at the second polar state to determine the Brillouin traces and the Rayleigh traces with respect to the DUT.

20. The channel checker OTDR of claim 14, wherein the DUT is an optical fiber.

* * * * *